(12) United States Patent
Totsuka (10) Patent No.: US 9,987,855 B2
(45) Date of Patent: Jun. 5, 2018

(54) IMAGE PROCESSING APPARATUS AND IMAGE PROCESSING METHOD

(71) Applicant: CANON KABUSHIKI KAISHA, Tokyo (JP)

(72) Inventor: Atsushi Totsuka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/524,762

(22) PCT Filed: Dec. 1, 2015

(86) PCT No.: PCT/JP2015/005977
§ 371 (c)(1),
(2) Date: May 5, 2017

(87) PCT Pub. No.: WO2016/098298
PCT Pub. Date: Jun. 23, 2016

(65) Prior Publication Data
US 2017/0320332 A1 Nov. 9, 2017

(30) Foreign Application Priority Data

Dec. 19, 2014 (JP) ................................ 2014-256906

(51) Int. Cl.
*B41J 2/21* (2006.01)
*B41J 3/407* (2006.01)
(Continued)

(52) U.S. Cl.
CPC ............... *B41J 2/21* (2013.01); *B41J 2/525* (2013.01); *B41J 3/407* (2013.01); *G06T 1/0007* (2013.01); *H04N 1/46* (2013.01); *H04N 1/60* (2013.01)

(58) Field of Classification Search
None
See application file for complete search history.

(56) References Cited

U.S. PATENT DOCUMENTS

| 6,914,623 B2 * | 7/2005 | Ogawa | A61B 1/00096 |
| | | | 348/45 |
| 2012/0154832 A1 | 6/2012 | Yokoyama et al. | |
| 2012/0314233 A1 | 12/2012 | Yamada | |

FOREIGN PATENT DOCUMENTS

| JP | 2004-299058 A | 10/2004 |
| JP | 2008-105435 A | 5/2008 |

(Continued)

OTHER PUBLICATIONS

IP.com.*
International Search Report dated Feb. 23, 2016 in corresponding International Application No. PCT/JP2015/005977, 3 pages.

*Primary Examiner* — Lisa M Solomon
(74) *Attorney, Agent, or Firm* — Carter, DeLuca, Farrell & Schmidt, LLP (57) ABSTRACT

An image processing apparatus is used for processing of reproducing a target object by applying color onto a structure formed based on a concavo-convex signal indicating a shape of the target object. The image processing apparatus determines, based on concavo-convex data, color data, and color reproducibility, a correction area which is an area in which color reproduction represented by the color data is decreased according to the shape represented by the concavo-convex data. The image processing apparatus corrects the concavo-convex data by smoothing the concavo-convex signal corresponding to the determined correction area.

11 Claims, 11 Drawing Sheets

(51) Int. Cl.
*H04N 1/60* (2006.01)
*B41J 2/525* (2006.01)
*G06T 1/00* (2006.01)
*H04N 1/46* (2006.01)

(56) References Cited

FOREIGN PATENT DOCUMENTS

JP 2010-2465 A 1/2010
JP 2014-107627 A 6/2014

* cited by examiner

| n  | L  | a  | b  |
|----|----|----|----|
| xx | xx | xx | xx |
|    | ⋮  | ⋮  | ⋮  |
|    | xx | xx | xx |
| xx | xx | xx | xx |
|    | ⋮  | ⋮  | ⋮  |
|    | xx | xx | xx |
| ⋮  | ⋮  | ⋮  | ⋮  |
| xx | xx | xx | xx |
|    | ⋮  | ⋮  | ⋮  |
|    | xx | xx | xx |

IMAGE PROCESSING APPARATUS AND IMAGE PROCESSING METHOD

TECHNICAL FIELD

The present invention relates to an image processing apparatus and an image processing method for outputting and reproducing concavo-convex and color of a target object.

BACKGROUND ART

As a method for forming concavo-convex and a stereoscopic object, a method using an ink jet printing system is known. PTL 1 discloses an ink jet printer for obtaining a hard copy on which stereoscopic effects and texture are represented by forming concavo-convex and color. The printer disclosed in PTL 1 has three heads. First, a first head applies a photocurable resin of an achromatic color to form a concavo-convex layer of an achromatic color. Then, on the concavo-convex layer, a second head forms a color layer for reproducing an image. Finally, on the color layer, a fine concavo-convex layer for reproducing texture is formed. As described above, there is disclosed a technique of representing stereoscopic effects, color, and texture by sequentially forming layers.

CITATION LIST

Patent Literature

[PTL 1]
Japanese Patent Laid-Open No. 2004-299058

SUMMARY OF INVENTION

Technical Problem

However, in a case where color is formed on concavo-convex, a desirable color may not be obtained depending on the concavo-convex shape because printing with a color ink in the same amount and in the same pattern may expand or narrow a color reproduction range due to variations in the concavo-convex shape.

Solution to Problem

According to the present invention, an image processing apparatus used for processing of reproducing a target object by applying color onto a structure formed based on a concavo-convex signal indicating a shape of the target object, includes: an obtaining unit configured to obtain concavo-convex data including the concavo-convex signal indicating the shape of the target object, color data including a color signal indicating color for each position of the target object, and color reproducibility according to a shape of concavo-convex; a determining unit configured to determine a correction area based on the obtained concavo-convex data, color data, and color reproducibility, the correction area being an area in which color reproducibility represented by the color data is decreased according to the shape represented by the concavo-convex data; and a correction unit configured to correct the concavo-convex data obtained by the obtaining unit by smoothing the concavo-convex signal corresponding to the determined correction area.

Advantageous Effects of Invention

According to the present invention, it is possible to increase color reproducibility of a target object.

Further features of the present invention will become apparent from the following description of exemplary embodiments (with reference to the attached drawings).

DESCRIPTION OF EMBODIMENTS

With reference to the attached drawings, detailed descriptions will be given based on the preferred embodiments of the present invention. It should be noted that the configurations shown in the following embodiments are only exemplary, and the present invention is not limited to the configurations shown in the drawings.

In the following embodiments, descriptions will be given of examples of printers for printing a color layer on a concavo-convex shape of an achromatic color, in which degradation of an image quality caused by a difference in color reproduction due to a concavo-convex shape is avoided. Before each embodiment will be described, occurrence of variations in a color reproduction range (e.g., a color gamut) due to the concavo-convex shape will be described with reference to FIGS. 1A to 1C.

Figure 1A:
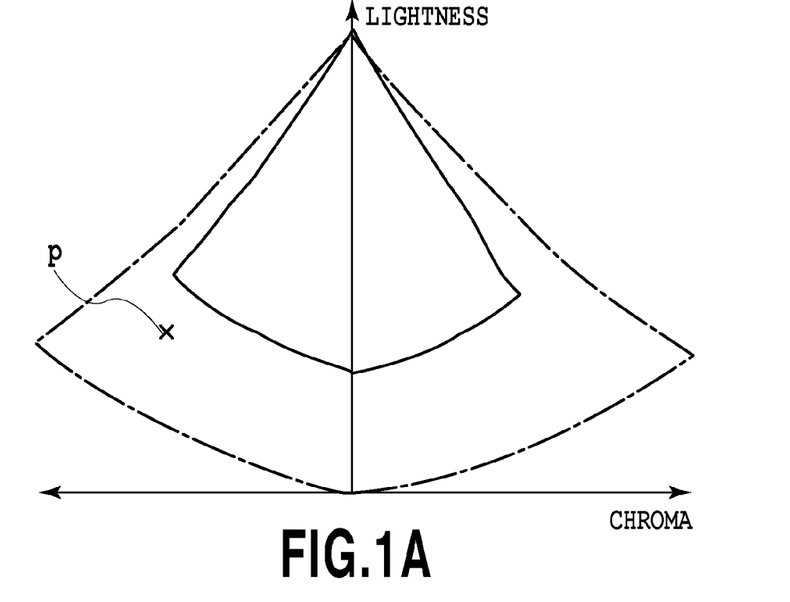
FIG. 1A is a conceptual view illustrating changes in a color gamut by concavo-convex.
Figure 1B:
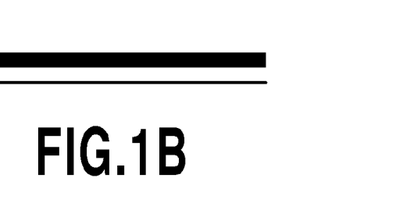
FIG. 1B is a conceptual view illustrating changes in a color gamut by concavo-convex.
Figure 1C:
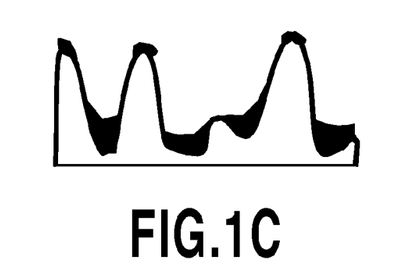
FIG. 1C is a conceptual view illustrating changes in a color gamut by concavo-convex.

FIG. 1A shows a color gamut, with a horizontal axis indicating chroma and a vertical axis indicating lightness. FIGS. 1B and 1C are schematic views of results in which a color material in the same amount is applied to concavo-convex layers having different shapes, as viewed from a cross-sectional direction of a base, and a black area represents a color layer. As shown in FIGS. 1B and 1C, a coverage rate of the color material differs depending on the shape of the concavo-convex layer. Then, as shown in FIG. 1C, as the frequency and the amplitude of the concavo-convex layer increase, an exposure area of the concavo-convex layer after coloring increases. Therefore, even in the case of using a printer by which a color gamut shown by alternate long and short dashed lines in FIG. 1A is obtained on a smooth surface shown in FIG. 1B, the shape shown in FIG. 1C has a smaller color gamut in a low lightness portion due to exposure of a white portion, namely, the concavo-convex layer. As a result, the color gamut that can be reproduced in the concavo-convex shape shown in FIG. 1C is the color gamut shown by solid lines in FIG. 1A. For example, color of a point p in FIG. 1A can be reproduced on the concavo-convex layer shown in FIG. 1B, but cannot be reproduced on the concavo-convex layer shown in FIG. 1C. In this manner, depending on the concavo-convex shape, a desirable color may not be reproduced.

In the present embodiment, a higher priority is given to color reproduction according to the concavo-convex shape and color of a target object, and concavo-convex having a higher frequency and a higher amplitude which cause a narrower color gamut is smoothed. This allows a smoothed area to have a larger color gamut, and an appropriate color reproduction result to be obtained.

First Embodiment

A constituent element to be reproduced related to the present embodiment is a structure including at least color and concavo-convex shape. In the present embodiment, as an example of an object to be reproduced, a description will be given of a color printed material having a concavo-convex shape. In the structure, color is applied on the concavo-convex shape. In this example, for numerical representation of color, for example, a CIELAB value calculated according to JISZ8729 or an RGB value calculated by an sRGB conversion formula from the CIELAB value may be used. Further, for numerical representation of the concavo-convex shape, for example, a height relative to a reference plane may be used.

(Schematic Configuration of an Image Processing Apparatus)

Figure 2:
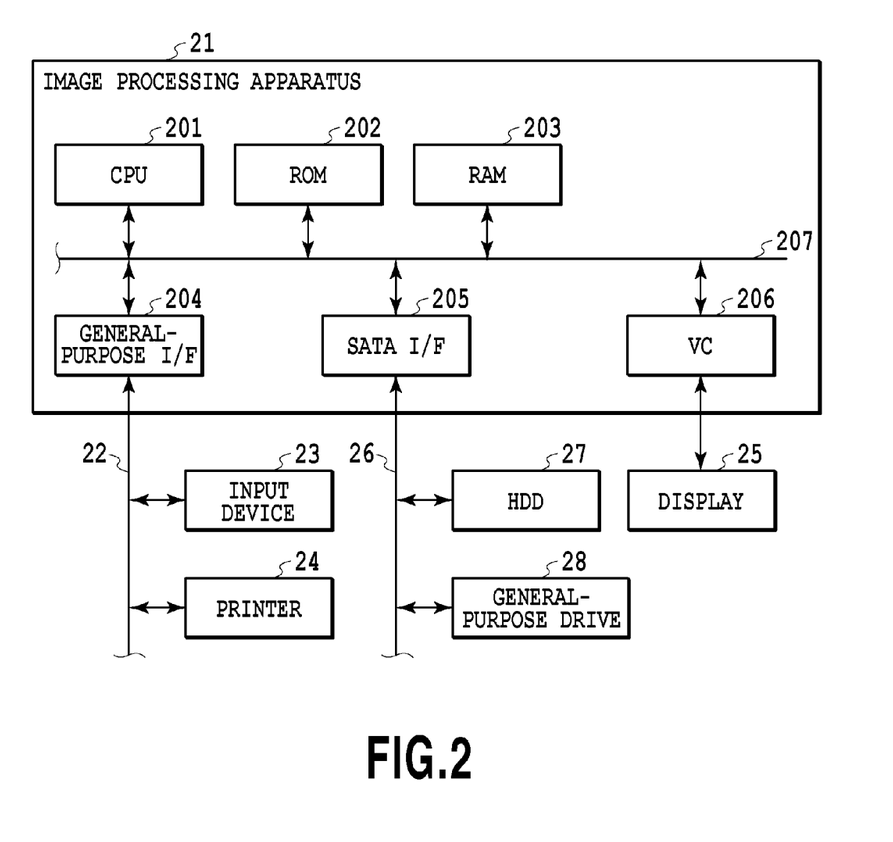
FIG. 2 is a block diagram showing an example of a configuration of an image processing apparatus according to a first embodiment.

FIG. 2 is a diagram showing an example of a configuration of an image processing apparatus 21 according to a first embodiment. The image processing apparatus 21 has a CPU 201, a ROM 202, a RAM 203, a general-purpose interface (I/F) 204, a serial ATA (SATA) I/F 205, and a video card (VC) 206. Further, the image processing apparatus 21 is connected to an input device 23, a printer 24, a display 25, a hard disk drive (HDD) 27, and a general-purpose drive 28. A configuration including the input device 23, the printer 24, the display 25, the HDD 27, and the general-purpose drive 28 may be referred to as an image processing apparatus.

The CPU 201 executes an operating system (OS) and various programs stored in the RAM 203 as a work memory, the ROM 202, the HDD 27, or various recording media. The CPU 201 also has control over the components via a system bus 207. It should be noted that examples of the programs executed by the CPU 201 include programs such as image processing (described later).

The general-purpose I/F 204 is a serial bus interface such as a USB, for example, and is connected to the input device 23, such as a mouse and a keyboard, the printer 24, and the like via a serial bus 22.

The serial ATA (SATA) I/F 205 is connected to the HDD 27 and the general-purpose drive 28 for reading from and writing to the various recording media. The CPU 201 uses the HDD 27 and the various recording media mounted to the general-purpose drive 28 as data storage areas for reading and writing.

The video card (VC) 206 is a video interface and is connected to the display 25. The CPU 201 displays on the display 25 a user interface (UI) provided by a program and receives a user input including a user instruction via the input device 23.

(Function Configuration of an Image Processing System)

Figure 3:
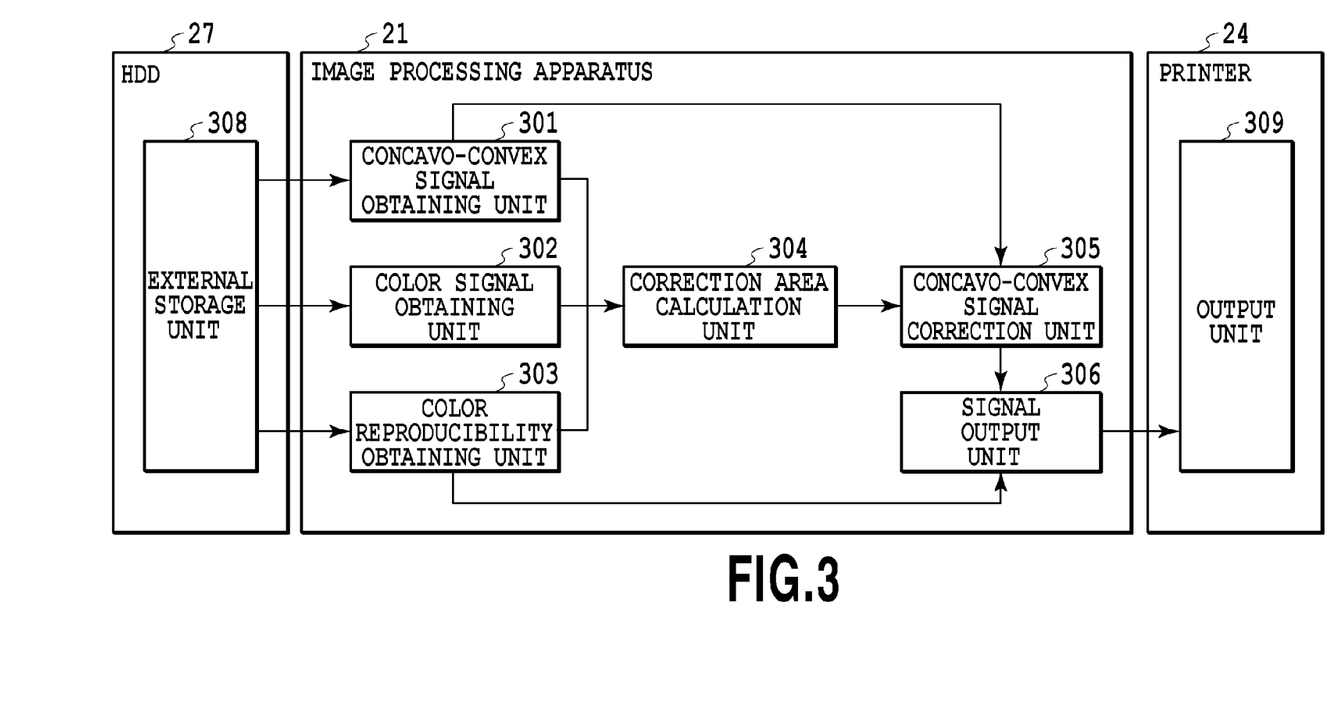
FIG. 3 is a block diagram showing a function configuration of an image processing system according to the first embodiment.

FIG. 3 is a block diagram showing a function configuration of an image processing system including the image processing apparatus of the first embodiment. It should be noted that an apparatus including all components shown in FIG. 3 may be referred to as an image processing apparatus, as described above. The image processing apparatus 21 includes a concavo-convex signal obtaining unit 301, a color signal obtaining unit 302, a color reproducibility obtaining unit 303, a correction area calculation unit 304, a concavo-convex signal correction unit 305, and a signal output unit 306. Further, the HDD 27 has an external storage unit 308, and the printer 24 has an output unit 309.

In the present image processing system, the correction area calculation unit 304 and the concavo-convex signal correction unit 305 perform correction processing on a concavo-convex signal. Further, the concavo-convex signal obtaining unit 301, the color signal obtaining unit 302, and the color reproducibility obtaining unit 303 obtain data needed for the correction processing from the external storage unit 308. The signal output unit 306 outputs, to the output unit 309, a concavo-convex signal and a color signal which have been subjected to the correction processing.

(Image Processing Method—an Operation in the Image Processing Apparatus 21)

Figure 4:
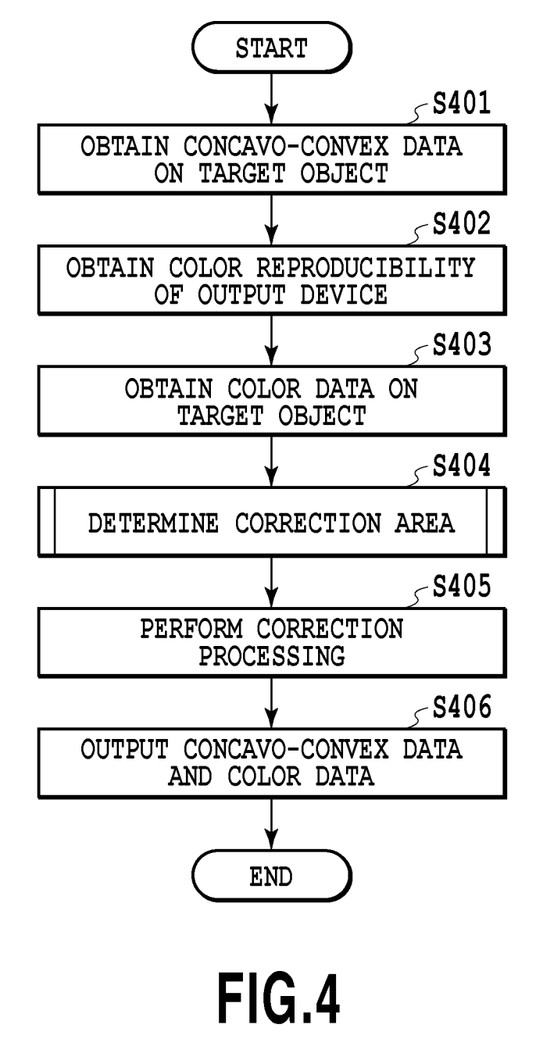
FIG. 4 is a flow chart illustrating a processing operation of the image processing apparatus according to the first embodiment.

FIG. 4 is a flow chart of the present image processing. With reference to FIG. 4, details of an operation in the image processing apparatus 21 will be described. It should be noted that the following operation is performed by accepting a predetermined instruction inputted by a user via the input device 23. Furthermore, the following operation is achieved by the CPU 201 executing the programs stored in the RAM 203 as a work memory, the ROM 202, and the hard disk drive (HDD) 27, as described above.

Figure 5A:
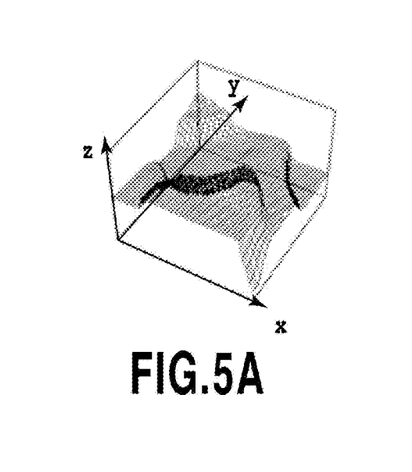
FIG. 5A is a conceptual view illustrating concavo-convex signals.
Figure 5B:
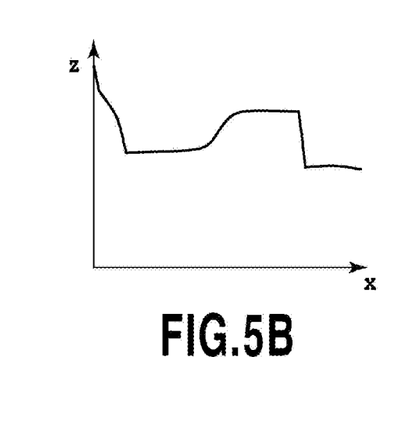
FIG. 5B is a conceptual view illustrating concavo-convex signals.
Figure 5C:
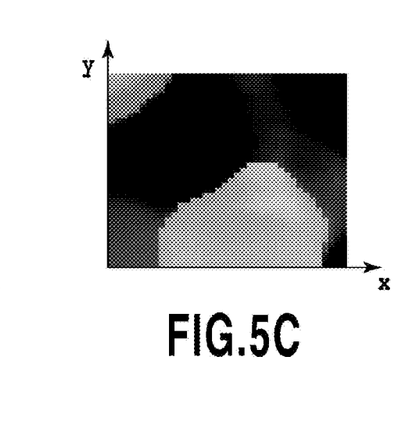
FIG. 5C is a conceptual view illustrating concavo-convex signals.

First, in step S401, the concavo-convex signal obtaining unit 301 obtains, from the external storage unit 308, concavo-convex data on a target object to be reproduced. The concavo-convex data is composed of concavo-convex signals on positions of the target object. That is, the concavo-convex signal obtaining unit 301 obtains a concavo-convex signal on each position of the target object. FIG. 5A shows an example in which concavo-convex signals of the target object are represented on three x, y, and z axes: the x and y axes indicating the positions of the target object, and the z axis indicating the height of the target object. Further, FIG. 5B shows a cross section of an xz plane on a certain point of the y axis. In the present embodiment, the obtained concavo-convex data on the target object represents a two-dimensional image resulting from converting a height z value of x and y coordinates of the target object into a pixel value. The two-dimensional image is hereinafter referred to as a concavo-convex image. That is, in step S401, the concavo-convex signal obtaining unit 301 obtains concavo-convex data representing the concavo-convex image which defines a height on each position of the target object. It should be noted that FIG. 5C is an example in which the concavo-convex signals shown in FIG. 5A are represented on the concavo-convex image.

Figure 6:
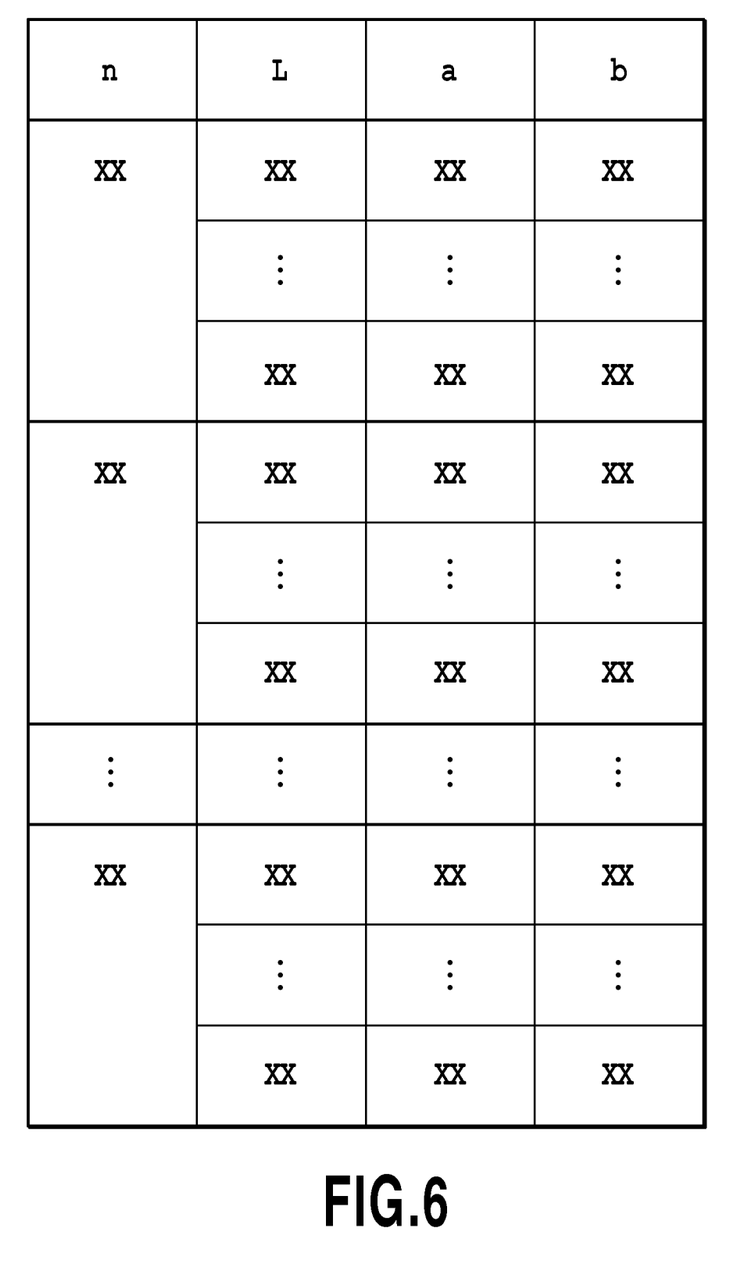
FIG. 6 is a table showing an example of a data format of color reproducibility of an output device according to the first embodiment.

Next, in step S402, the color reproducibility obtaining unit 303 obtains color reproducibility of an output device from the external storage unit 308. The output device indicates the printer 24, and the color reproducibility represents a color gamut table of the printer 24 according to a shape, for example. In this example, if a shape parameter which affects the color gamut is set as a normal angle n relative to a reference plane, data on the color reproducibility may be held in a format shown in FIG. 6, for example. In FIG. 6, n indicates a normal angle, and L, a, and b indicate a CIELAB value. The external storage unit 308 holds a color gamut table in which CIELAB values (color gamuts) of 729 colors (9^3) in total, which are obtained by dividing each of RGB into 9 equal parts, for example, are associated for each normal angle n. It should be noted that the normal angle may be calculated from a concavo-convex signal, namely, a height. The normal angle is used as an example of the shape parameter which affects the color gamut, but the amplitude and the frequency obtained by converting the two-dimensional image data on concavo-convex signals into a frequency image may also be used or the sum total of differential values of heights between adjacent pixels or the like may also be used. That is, a description has been given of the example of obtaining, as color reproducibility, the color gamut table in which the normal angle as the shape parameter is associated with the color gamut, but a table in which the amplitude and frequency of a concavo-convex signal is associated with the color gamut may also be used. Alternatively, a table in which the sum total of differential values of heights between adjacent pixels of concavo-convex signals is associated with the color gamut may be used as color reproducibility. It can also be said that the shape parameter is a value indicating a characteristic of concavo-convex. The color gamut table is a table in which the value indicating a characteristic of concavo-convex is associated with a color gamut that can be reproduced by the output device on the concavo-convex surface.

Next, in step S403, the color signal obtaining unit 302 obtains, from the external storage unit 308, color data on the target object to be reproduced. The color data is composed of color signals on positions of the target object. That is, the color signal obtaining unit 302 obtains a color signal on each position of the target object. In the present embodiment, the obtained color data on the target object represents a two-dimensional image resulting from converting a CIELAB value of the x and y coordinates of the target object into a pixel value of three channels. The two-dimensional image is hereinafter referred to as a color image. That is, in step S403, the color signal obtaining unit 302 obtains color data representing the color image which defines color on each position of the target object.

Next, in step S404, the correction area calculation unit 304 calculates a correction area based on the concavo-convex data on the target object obtained in step S401, the color reproduction range of the printer 24 obtained in step S402, and the color data on the target object obtained in step S403. More specifically, the correction area calculation unit 304 calculates a correction area in the concavo-convex image represented by the concavo-convex data obtained in step S401. Details of this processing will be described later.

Next, in step S405, the concavo-convex signal correction unit 305 performs correction processing on the concavo-convex image. The correction processing indicates processing of smoothing a pixel value which has been determined as the correction area in the concavo-convex image in step S404. In the smoothing of the present embodiment, a simple moving average filter is used which replaces a target pixel with a simple unweighted average of neighboring pixels, but a data dependent filter, such as an ε filter and a bilateral filter, may also be used.

Figure 5D:
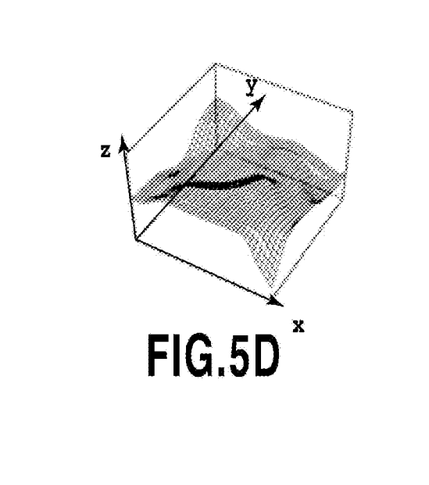
FIG. 5D is a conceptual view illustrating concavo-convex signals.
Figure 5E:
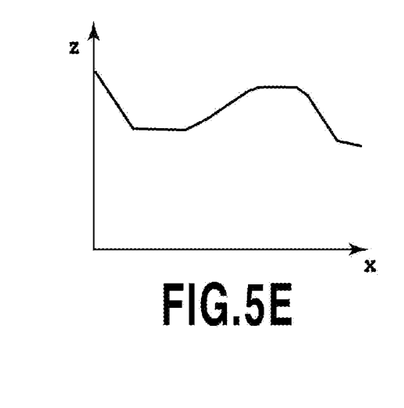
FIG. 5E is a conceptual view illustrating concavo-convex signals.
Figure 5F:
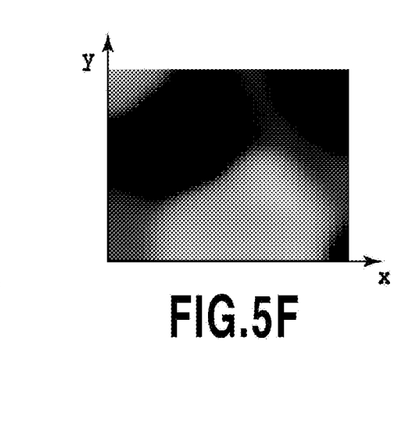
FIG. 5F is a conceptual view illustrating concavo-convex signals.

Finally, in step S406, the signal output unit 306 outputs, to the output unit 309 of the printer 24, the concavo-convex data representing the concavo-convex image corrected in step S405 and the color data obtained in step S403. FIG. 5F shows an example of the corrected concavo-convex image obtained by correcting the concavo-convex image shown in FIG. 5C. FIGS. 5D and 5E show concavo-convex signals as corrected corresponding to the concavo-convex signals shown in FIGS. 5A and 5B, respectively. It should be noted that the examples of the concavo-convex images shown in FIGS. 5A to 5F are results of determining the entire area to be the correction area in step S404 and performing the smoothing processing on the entire area in step S407. As a matter of course, in a case where a portion of the area is determined to be an area to be corrected, only the portion of the area is subjected to the smoothing processing.

(Details of Correction Area Calculation Processing)

Figure 7:
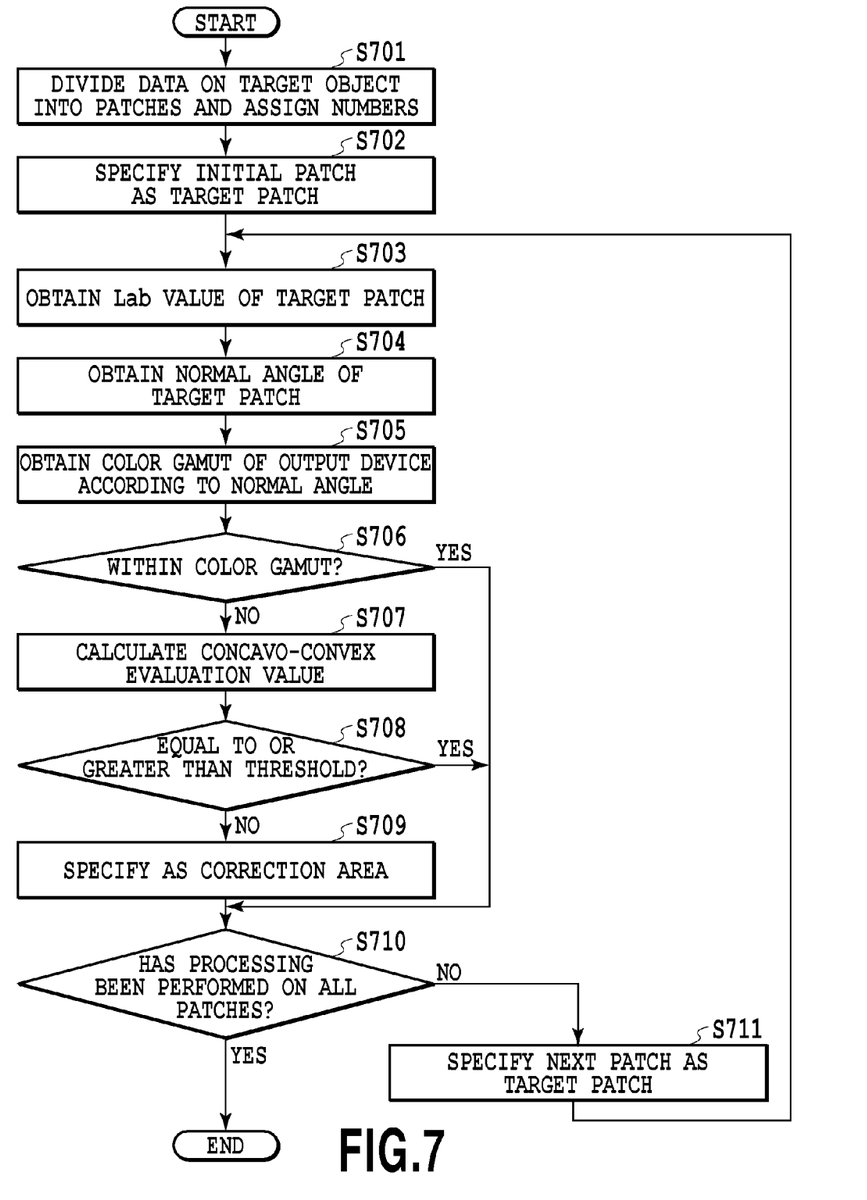
FIG. 7 is a flow chart illustrating processing of a correction area calculation unit according to the first embodiment.

With reference to FIG. 7, a description will be given of the details of correction area calculation processing performed in the correction area calculation unit 304 in step S404.

First, in step S701, the correction area calculation unit 304 divides the concavo-convex image and the color image into predetermined N unit areas, and numbers are assigned to the unit areas. The processing described below in step S703 to step S710 is performed for each unit area. It should be noted that the unit area only needs to be an area consisting of one or more pixels in the image. In the present embodiment, the concavo-convex image and the color image are images having the same number of pixels, and their respective areas correspond to each other. In the present embodiment, one pixel is handled as one area. This area is referred to as a patch. Further, number 0 is assigned to the upper right of the image, and numbers are assigned in order of raster scanning, but the method of numbering is not limited to this.

Next, in step S702, the correction area calculation unit 304 specifies, as a patch to be processed, an initial patch which will be subjected to the processing described below in step S703 to step S709, that is, a pixel to which number 0 is assigned in step S701.

Next, in step S703, the correction area calculation unit 304 obtains, from the color image, a CIELAB value of the patch to be processed. In step S704, the correction area calculation unit 304 obtains, from the concavo-convex image, a normal angle of the patch to be processed. The correction area calculation unit 304 calculates the normal angle from a value of the patch to be processed (pixel) and values of its adjacent patches (pixels) in the concavo-convex image, namely, a height. More specifically, first, in the x, y, and z coordinates, x and y indicating coordinates and z indicating a height on the concavo-convex image, the correction area calculation unit 304 calculates two vectors $A=(1, 0, d-c)$ and $B=(0, 1, e-c)$. $A=(1, 0, d-c)$ consists of the patch to be processed $(a, b, c)$ and the adjacent patch $(a+1, b, d)$, and $B=(0, 1, e-c)$ consists of the patch to be processed $(a, b, c)$ and the adjacent patch $(a, b+1, e)$. Next, a normal vector C is obtained by the outer product of the vectors A and B, and an angle of the normal vector is calculated to obtain a normal angle. It should be noted that the normal angle may be obtained by using other adjacent patches at the time of calculation. The normal angle thus obtained is indicated by n. In a case where the color reproducibility obtained in step S402 holds a color gamut according to different parameters such as the frequency and the amplitude of concavo-convex as described above, these parameters are calculated from the concavo-convex image.

Next, in step S705, the correction area calculation unit 304 obtains the color gamut of the output device according to the normal angle n obtained in step S704. More specifically, with reference to the color gamut table shown in FIG. 6 which stores the color gamut of the printer for each normal angle obtained in step S402, a color gamut corresponding to the normal angle n is extracted. In this example, in a case where the corresponding color gamut cannot be obtained, a difference between the normal angle n and each normal angle stored in the color gamut table may be calculated, and a color gamut corresponding to the normal angle having the smallest difference may be extracted. Alternatively, a color gamut obtained by interpolating two color gamuts according to a ratio based on the difference between the normal angles may be used. In a case where L1 and L2 indicate brightness values in normal angles n1 and n2 and L indicates a brightness value in a normal angle n, the interpolation operation can be performed by the following equation (1): $L=(L1\times(n2-n)+L2\times(n-n1))/(n2-n1)$, wherein $n2>n$, $n>n1$. In the same manner, the calculation is performed on each color, a, and b.

Next, in step S706, the correction area calculation unit 304 determines whether the CIELAB value of the patch to be processed obtained in step S703 is within a range of the color gamut obtained in step S705. If the CIELAB value is within the color gamut, the process proceeds to step S710. If the CIELAB value is out of the color gamut, the process proceeds to step S707.

Next, in step S707, the correction area calculation unit 304 calculates a concavo-convex evaluation value of the patch to be processed. The concavo-convex evaluation value is a numerical value representing an importance of a concavo-convex signal of the target object, and is used for determining whether a concavo-convex signal reproduction accuracy has a higher priority than a color reproduction accuracy. In the present embodiment, a value is used which is obtained by converting the patch to be processed into frequency data by the two-dimensional Fourier transform, and by performing a convolution operation of the frequency characteristic and the visual transfer function (VTF). However, in a case where the patch to be processed is not data on a two-dimensional image area, but is one pixel, only in this processing, an area obtained by expanding the patch to be processed is handled as an area to be processed. It should be noted that as the evaluation value, the frequency or the amplitude, for example, may be directly used, or the frequency and the amplitude may be individually held as evaluation values and the two values may be handled independently. Alternatively, without converting the patch to be processed into the frequency data, a statistic may be used such as the sum total or dispersion of differences between adjacent pixels of concavo-convex.

Next, in step S708, the correction area calculation unit 304 uses a predetermined threshold and determines whether the evaluation value calculated in step S707 is equal to or greater than the threshold. If it is determined that the evaluation value is equal to or greater than the threshold by the determination, that is, if visibility of a concavo-convex portion is high, a concavo-convex reproduction accuracy for the target object is given a higher priority, and the concavo-convex signal in the area will not be corrected. Then, the process proceeds to step S710. If it is determined that the evaluation value is less than the threshold, that is, if visibility of the concavo-convex portion is low, a color reproduction accuracy is given a higher priority, and the concavo-convex signal in the area will be corrected. Then, the process proceeds to step S709.

Next, in step S709, the correction area calculation unit 304 stores the patch to be processed as a correction area. Examples of a storing method include a technique of creating in advance an image having the same number of pixels as that of the concavo-convex image and having all initial values of 0 and then replacing with 1 a pixel value in the target area determined to be the correction area.

Next, in step S710, the correction area calculation unit 304 confirms whether determination of a correction area has been made on all numbered patches, that is, the correction area calculation unit 304 confirms whether the processing in step S703 to step S709 has been performed on all numbered patches. In the present embodiment, the processing is performed in ascending order of numbers. If the patch to be processed has number N−1, it is determined that the processing has been performed on all patches, and the processing in the correction area calculation unit 304 is finished. If the patch to be processed has a number which is smaller than N−1, in step S711, the patch to be processed is changed to a patch having the next number. It should be noted that the number of patches to be processed is N.

According to the above-described embodiment, the area in which desired color reproduction cannot be obtained is determined, and according to the importance of concavo-convex reproduction in the area, the concavo-convex signal is subjected to smoothing processing. By performing the smoothing processing, it becomes possible to increase a color reproduction range in the processed area and obtain a desirable color reproduction result. Meanwhile, even in the area in which desired color reproduction cannot be obtained, with respect to an area having a higher importance of concavo-convex reproduction, a higher priority may be given to the concavo-convex reproduction without smoothing the concavo-convex signal. It should be noted that even if the concavo-convex shape is corrected in an area having a lower importance of concavo-convex reproduction, the correction is less likely to affect visibility.

Modification Example 1

In the present embodiment, the concavo-convex evaluation value is calculated only from the concavo-convex image in step S707 and the concavo-convex evaluation value is used as an index to determine whether to correct concavo-convex. However, a value calculated by adding a light source or observation position information may also be defined as the concavo-convex evaluation value. For example, an observation position may be set in advance to a position facing a target object, and a light source as a parallel light source may be set in advance at an incident angle θ on the target object. Then, from the information and the concavo-convex image, a shield area, that is, a shadow area, produced by the concavo-convex in each area may be calculated, and a size of the area may be used as an evaluation value. This specific example will be described with reference to the flow chart shown in FIG. 8. It should be noted that the processing is performed by the correction area calculation unit 304 in step S707.

Figure 8:
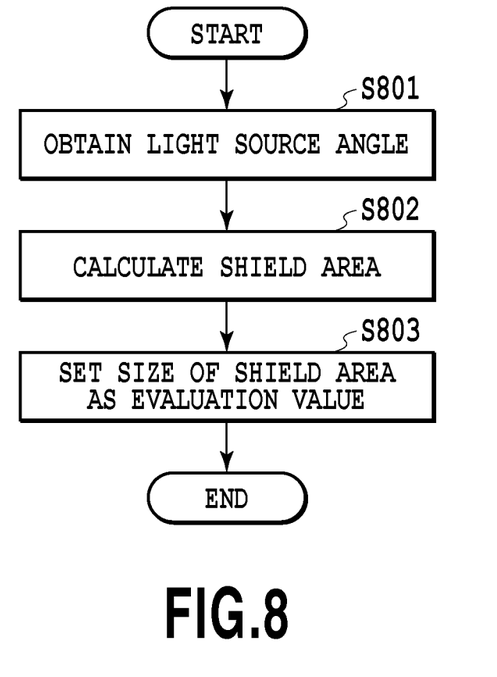
FIG. 8 is a flow chart illustrating a method for calculating a concavo-convex evaluation value.

In step S801, the correction area calculation unit 304 obtains a light source incident angle. In the present modification example, the angle is a value preset in the image processing apparatus 21, but a light source incident angle obtaining unit may be provided in the image processing apparatus 21 like the concavo-convex signal obtaining unit 301 to obtain the light source incident angle from the external storage unit 308 or the like. A description will be given on the assumption that in three x, y, and z axes, the parallel light source obtained in step S801 is parallel to the y axis, and an angle defined with respect to the x axis is $\theta$ degrees.

Figure 9:
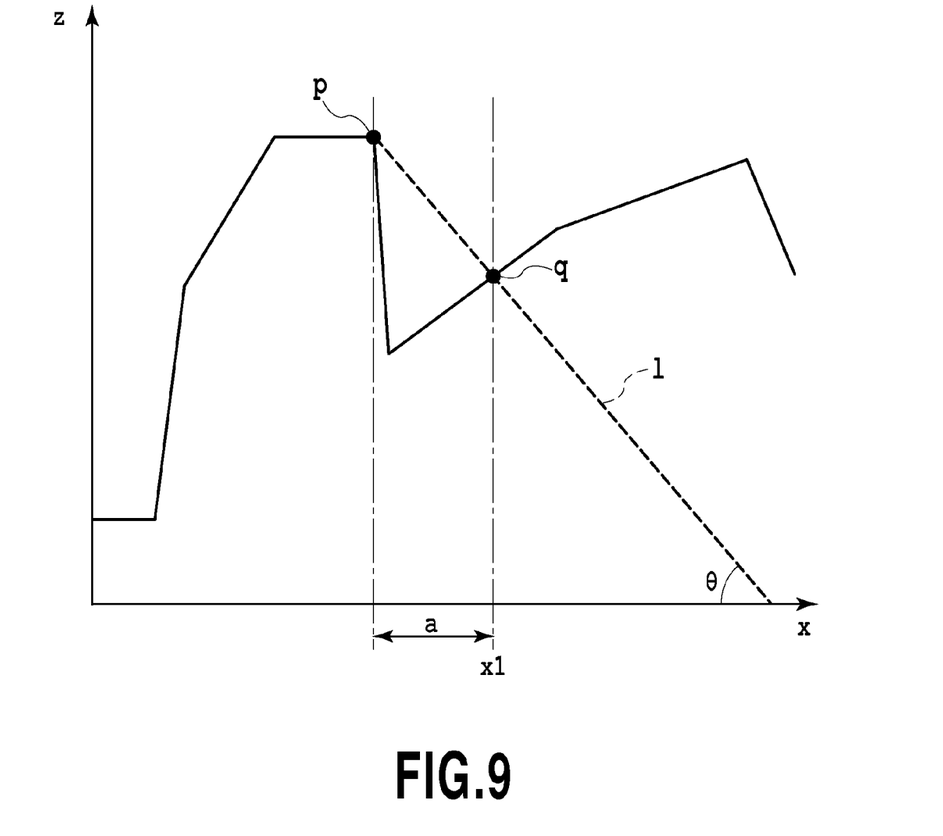
FIG. 9 is a conceptual view illustrating the method for calculating a concavo-convex evaluation value.

In step S802, the correction area calculation unit 304 calculates a shield area formed by the concavo-convex in the patch to be processed. A description will be given of the method for calculating a shield area under the parallel light source with reference to FIG. 9. FIG. 9 shows a concavo-convex signal on the xz plane, passing through the patch to be processed. First, on the xz plane, a straight line 1 is drawn in the x axis direction from a patch p to be processed at an angle $\theta$ with respect to the x axis. Next, a comparison is made between a height (z value) of the straight line 1 in each x value and a height (z value) of the concavo-convex signal of the target object. A point q is searched at which a height of the straight line 1 is equal to or less than a height of the concavo-convex signal of the target object and a distance from the point p is the smallest. As described above, the concavo-convex signal between the obtained point q and the point p is set as the shield area.

In step S803, the correction area calculation unit 304 holds the size of the shield area formed by the concavo-convex of the patch to be processed as a concavo-convex evaluation value. Setting the size of the shield area as a concavo-convex evaluation value means for example that, as the size of the shield area increases, a concavo-convex evaluation value increases. That is, as the size of the shield area increases, an importance of the concavo-convex increases. Therefore, in a case where the size of the shield area produced by the influence of the patch to be processed is great, a higher priority is given to concavo-convex reproducibility and processing is performed accordingly.

In the present embodiment, since the observation position is defined as a position facing the target object, the size of the shield area indicates a distance on an xy plane of the shield area. Furthermore, in the above example of the incident angle, since the shield area is a line parallel to the x axis, the shield area corresponds to a distance indicated by a in FIG. 9. The observation position is not limited to the position facing the target object. An observation angle obtaining unit may be provided in the image processing apparatus 21 like the concavo-convex signal obtaining unit 301 to obtain the observation position from the external storage unit 308 or the like, and an area calculation according to a view position may be performed.

Other Modification Example

In the first embodiment, a description has been given of the example in which the image processing apparatus 21 outputs the corrected concavo-convex signal of the target object to the printer 24 since the printer 24 performs concavo-convex reproduction. However, a destination of the output signal is not limited to the printer 24. For example, the concavo-convex signal may be outputted to the HDD 27 or the storage device connected to the general-purpose drive 28. Furthermore, the units 301 to 306 of the image processing apparatus 21 shown in FIG. 3 may be included in the printer 24, or the external storage unit 308 in the HDD 27 may be included in the image processing apparatus 21 or the printer 24.

In the first embodiment, after determining whether color of the target object is within the color gamut, processing is equally performed irrespective of the color. However, a reproduction error in the case of reproducing the color of the target object in the color gamut may be calculated, and the error may be added as a condition for specifying a correction area. As the color reproduction error, a smallest distance in a LAB space, that is, a color difference, may be used. For example, even if the color is out of the color gamut, since a small color difference produces a small effect of improving a color reproduction accuracy by the concavo-convex correction, the color may be handled as a color within the color gamut in a case where the color difference is not greater than a predetermined threshold. Furthermore, in step S708, the color difference may be incorporated into a threshold which is compared with the concavo-convex evaluation value.

Second Embodiment

In the first embodiment, a description has been given of the example of correcting the concavo-convex signal based on predetermined conditions, but any correction conditions may be set by a user. In the present embodiment, a description will be given of a series of operations of an image processing apparatus in a case where correction conditions are arbitrarily selected by a user, with reference to the flow chart shown in FIG. 10. It should be noted that processing of a second embodiment that is similar to the processing of the first embodiment is indicated by the same reference numeral, and a detailed description thereof will be omitted.
(Operation in an Image Processing Apparatus)

Figure 10:
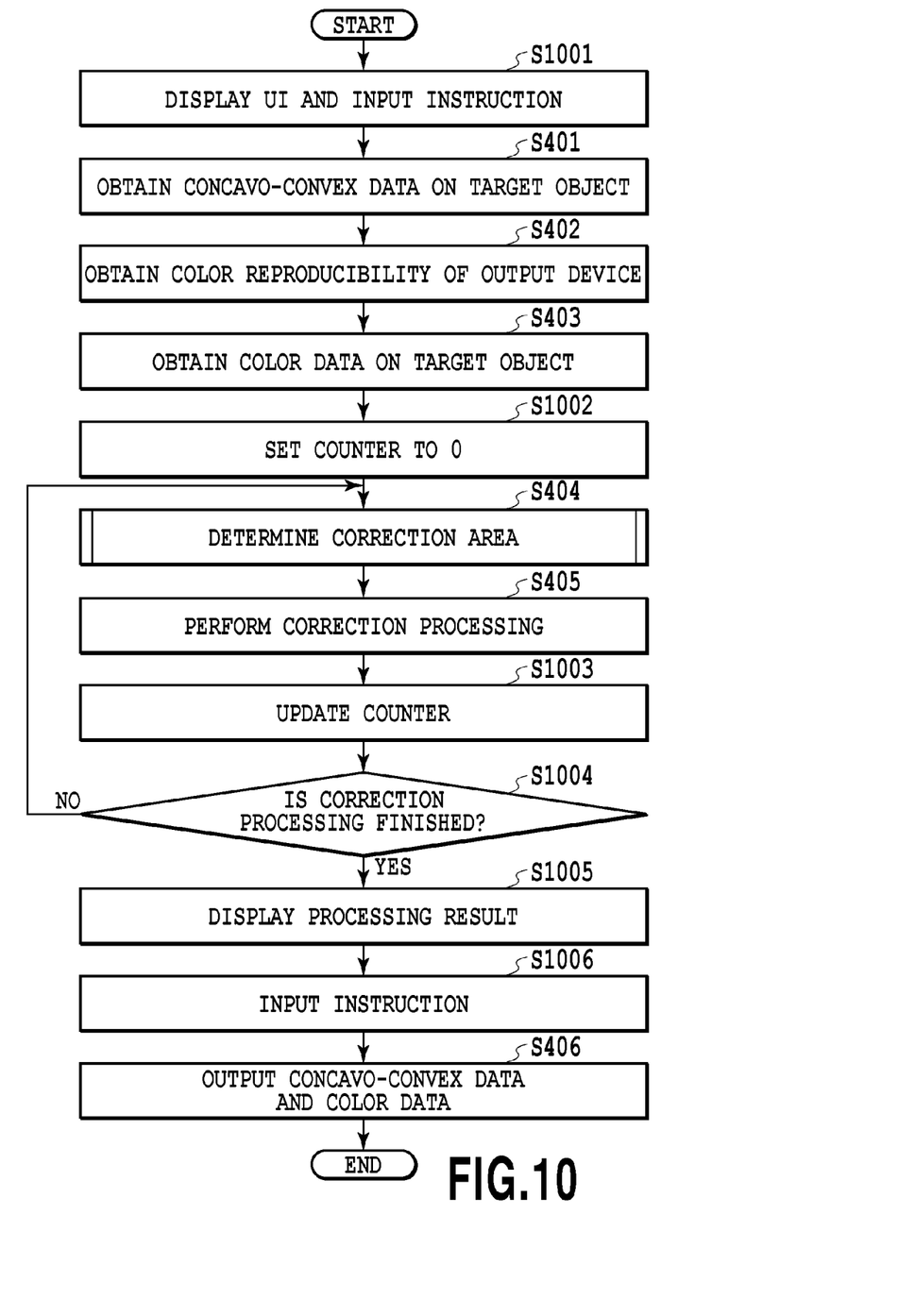
FIG. 10 is a flow chart illustrating a processing operation of an image processing apparatus according to a second embodiment.
Figure 11:
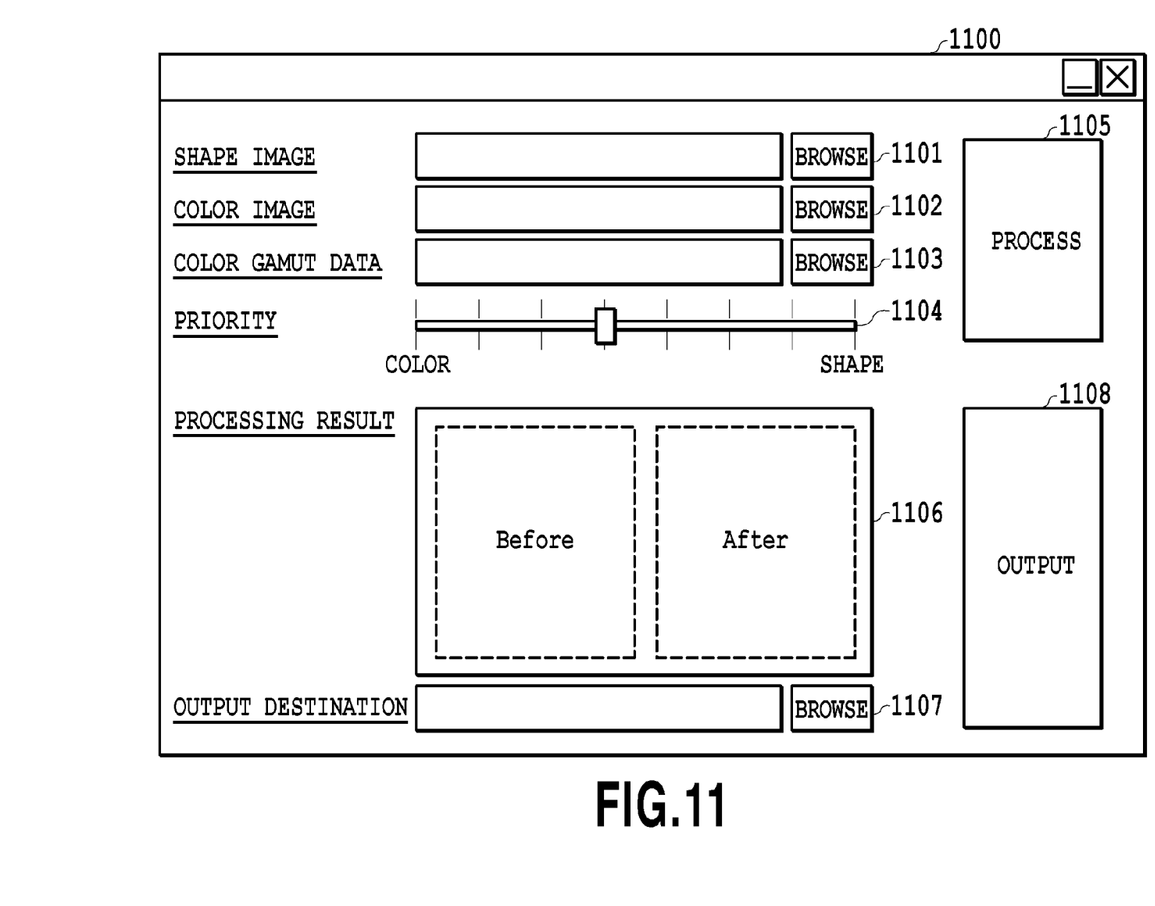
FIG. 11 is a user interface displayed on a display of the image processing apparatus according to the second embodiment.

First, in step S1001, a CPU 201 displays on a display 25 a user interface (UI) provided by a program and receives a user input including a user instruction via an input device 23. FIG. 11 shows an example of a UI 1100 to be displayed. Buttons 1101, 1102, and 1103 are used to respectively specify files in which a concavo-convex image of a target object, a color image of the target object, and color reproducibility of an output device are recorded. A slider bar 1104 is used to select correction conditions of concavo-convex data. Adjusting the slider bar allows selection of a priority level of concavo-convex shape or color. In the present embodiment, the number of repetitions of correction processing is determined by using the slider bar. To give a higher priority to color, the number of repetitions is increased. To give a higher priority to concavo-convex, the number of repetitions is decreased. A button 1105 is used to start the following processing. After inputting various kinds of information by using the buttons 1101 to 1104, pressing the button 1105 allows the process to proceed to step S401 in FIG. 10. After the button 1105 is pressed and until the correction processing is determined to be finished in step S1004, the UI 1100 stops receiving a user input.

The processing from step S401 to step S403 subsequent to step S1001 is similar to the processing of the first embodiment, so a description thereof will be omitted.

Next, in step S1002, a concavo-convex signal correction unit 305 initializes a counter indicating the number of processing to 0. Next, in step S404, a correction area calculation unit 304 determines whether an area is a correction area in which a concavo-convex signal is corrected. If the area is a correction area, in step S405, the concavo-convex signal correction unit 305 performs correction of the concavo-convex signal in the area determined to be the correction area.

Next, in step S1003, the concavo-convex signal correction unit 305 updates the counter indicating the number of processing. More specifically, the counter value is incremented by 1.

Next, in step S1004, the concavo-convex signal correction unit 305 determines whether the correction processing is finished. More specifically, the concavo-convex signal correction unit 305 determines whether the counter value has reached the number of repetitions specified by the user in step S1001. If the counter value has reached the specified number, the process proceeds to step S1005. If the counter value has not reached the specified number, the process returns to step S404. It should be noted that for the concavo-convex image to be subjected to the correction processing again in step S404, the data subjected to the correction processing in the previous step S405 is used.

Next, in step S1005, the concavo-convex signal correction unit 305 displays, on a display area 1106 in the UI 1100 shown in FIG. 8, a concavo-convex image before correction and a concavo-convex image after correction. The UI 1100 also cancels stopping of the receiving of a user input.

In step S1006, the CPU 201 accepts an input of an output instruction of a concavo-convex signal from the user. For example, the user confirms the concavo-convex image displayed in step S1005 and determines whether to output the concavo-convex signal which has been subjected to the correction processing. If the concavo-convex signal is outputted, an output instruction is sent. More specifically, the user presses a button 1107 in the UI 1100 shown in FIG. 8, and presses a button 1108 after specifying an output location and an output file name.

Finally, in step S406, a signal output unit 306 outputs, to an output unit 309, concavo-convex data and color data representing the corrected concavo-convex image.

According to the above embodiment, it is possible to perform correction of the concavo-convex signal for obtaining a reproduction result in which a priority level of concavo-convex or color set by a user is incorporated.

Other Modification Example

In the above embodiment, a priority level of color or concavo-convex is incorporated depending on the number of repetitions of the correction processing, but the priority level may be incorporated depending on a different parameter. For example, in the above description, for smoothing, which is the correction processing, a simple moving average filter which replaces a pixel value with a simple unweighted average of neighboring pixels is used. But the priority level may also be adjusted by the user selecting the size of the filter. Further, as a condition for repetition, instead of the number set as in the present embodiment, a percentage of an area out of a color gamut in an image or the like may be used. For example, in a case where a percentage of an area out of a color gamut is set to 0 or less, the correction processing is performed until all colors in the image are within the color gamut. Other than the percentage of an area out of a color gamut, any condition based on the color reproduction accuracy in the image, such as the sum total of color differences between colors, may be used. Furthermore, an objective function of the above-described color difference and concavo-convex evaluation value may be defined, and optimization of the objective function may be set as a condition. Furthermore, the user may specify the threshold used in step S708. Alternatively, in a case where a higher priority is given to color, the processing in step S707 and step S708 may be omitted.

In the above example, a binary image is displayed which represents whether each color on the color image is within the color gamut, but other information may be added to the binary image, and the resulting image may be displayed. For example, concavo-convex images before and after the correction processing may be displayed.

Furthermore, instead of equally specifying the conditions specified by the user for the entire area of the concavo-convex image, conditions may be specified and switched depending on the area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-256906, filed Dec. 19, 2014, which is hereby incorporated by reference wherein in its entirety.

The invention claimed is:

1. An image processing apparatus used for processing of reproducing a target object by applying color onto a structure formed based on a concavo-convex signal indicating a shape of the target object, the image processing apparatus comprising:
   an obtaining unit configured to obtain concavo-convex data including the concavo-convex signal indicating the shape of the target object, color data including a color signal indicating color for each position of the target object, and color reproducibility according to a shape of concavo-convex;

a determining unit configured to determine a correction area based on the obtained concavo-convex data, color data, and color reproducibility, the correction area being an area in which color reproducibility represented by the color data is decreased according to the shape represented by the concavo-convex data; and a correction unit configured to correct the concavo-convex data obtained by the obtaining unit by smoothing the concavo-convex signal corresponding to the determined correction area.

2. The image processing apparatus according to claim 1, wherein the concavo-convex signal is a signal indicating a height on a reference plane of the target object.

3. The image processing apparatus according to claim 1, wherein the obtaining unit obtains, as the color reproducibility, a color gamut table in which a value indicating a characteristic of concavo-convex is associated with a color gamut that can be reproduced on a surface of the concavo-convex.

4. The image processing apparatus according to claim 3, wherein the value indicating the characteristic of concavo-convex includes any one of a normal angle or a set of amplitude and frequency.

5. The image processing apparatus according to claim 4, wherein the determining unit obtains a normal angle in a unit area to be processed in the target object;

determines whether color in the unit area to be processed is within a color gamut corresponding to the normal angle with reference to the color gamut table; and in a case where the color in the unit area to be processed is not within the color gamut, determines that the unit area to be processed is the correction area.

6. The image processing apparatus according to claim 5, wherein the determining unit further calculates an evaluation value indicating an importance of concavo-convex in the unit area in a case where the color in the unit area to be processed is not within the color gamut corresponding to the normal angle; and determines that the unit area to be processed is the correction area in a case where the calculated evaluation value is less than a predetermined value.

7. The image processing apparatus according to claim 6, wherein the evaluation value indicating the importance includes anyone of a statistic of differential values between adjacent pixels, amplitude, frequency, or a set of amplitude and frequency, or a value calculated by a convolution operation of a frequency characteristic and a visual transfer function, which are calculated from the obtained concavo-convex signal.

8. The image processing apparatus according to claim 6, wherein the evaluation value indicates a size of a shield area of a concavo-convex signal in a predetermined light source incident angle.

9. The image processing apparatus according to claim 1, wherein the obtaining unit further obtains a parameter specified by a user, the parameter indicating whether a higher priority is given to concavo-convex reproducibility or color reproducibility; and wherein the correction unit determines a number of repetitions of the correction according to the parameter.

10. An image processing method used for processing of reproducing a target object by applying color onto a structure formed based on a concavo-convex signal indicating a shape of the target object, the image processing method comprising the steps of:

obtaining concavo-convex data including the concavo-convex signal indicating the shape of the target object, color data including a color signal indicating color for each position of the target object, and color reproducibility according to a shape of concavo-convex;

determining a correction area based on the obtained concavo-convex data, color data, and color reproducibility, the correction area being an area in which color reproducibility represented by the color data is decreased according to the shape represented by the concavo-convex data; and correcting the concavo-convex data obtained in the obtaining step by smoothing the concavo-convex signal corresponding to the determined correction area.

11. A non-transitory computer readable storage medium storing a program which causes a computer to perform an image processing method used for processing of reproducing a target object by applying color onto a structure formed based on a concavo-convex signal indicating a shape of the target object, the image processing method comprising the steps of:

obtaining concavo-convex data including the concavo-convex signal indicating the shape of the target object, color data including a color signal indicating color for each position of the target object, and color reproducibility according to a shape of concavo-convex;

determining a correction area based on the obtained concavo-convex data, color data, and color reproducibility, the correction area being an area in which color reproducibility represented by the color data is decreased according to the shape represented by the concavo-convex data; and correcting the concavo-convex data obtained in the obtaining step by smoothing the concavo-convex signal corresponding to the determined correction area.

* * * * *